United States Patent

[11] 3,616,390

| [72] | Inventor | John W. Weigl |
| | | West Webster, N.Y. |
| [21] | Appl. No. | 760,311 |
| [22] | Filed | Sept. 17, 1968 |
| [45] | Patented | Oct. 26, 1971 |
| [73] | Assignee | Xerox Corporation |
| | | Rochester, N.Y. |

[54] AN ELECTROPHORETIC IMAGING METHOD CHARACTERIZED BY EXPOSURE OF ELECTRICALLY PHOTOSENSITIVE PARTICLES AT A LIQUID NIP
6 Claims, 2 Drawing Figs.

[52] U.S. Cl.................................................. 204/181, 96/1, 96/1.3, 96/27
[51] Int. Cl................................................. G03g 13/22
[50] Field of Search............................................. 96/1, 1.3, 27; 204/181

[56] References Cited
UNITED STATES PATENTS

| 3,270,637 | 9/1966 | Clark.............................. | 95/1 |
| 3,427,242 | 2/1969 | Mibajlor........................ | 204/300 |

*Primary Examiner*—George F. Lesmes
*Assistant Examiner*—R. E. Martin
*Attorneys*—James J. Ralabate, David C. Petre and Richard A. Tomlin ABSTRACT: A photoelectrophoretic imaging system and apparatus are described wherein electrically photosensitive particles dispersed in a carrier liquid are subjected to an electric field and exposed to imagewise light causing selective particle migration in image configuration. The imagewise exposure is directed at a liquid nip of the particle-liquid suspension. The exposure is not directed through either nip forming surface.

PATENTED OCT 26 1971 3,616,390

INVENTOR.
JOHN W. WEIGL
BY
Richard A. Tomlin
ATTORNEY

3,616,390

AN ELECTROPHORETIC IMAGING METHOD CHARACTERIZED BY EXPOSURE OF ELECTRICALLY PHOTOSENSITIVE PARTICLES AT A LIQUID NIP

BACKGROUND OF THE INVENTION

This invention relates in general to imaging systems. More specifically, the invention concerns a photoelectrophoretic imaging system.

There has been recently developed an electrophoretic imaging system capable of producing color images which utilizes electrically photosensitive particles. This process is described in detail and claimed in U.S. Pat. Nos. 3,384,566 to H. E. Clark, 3,384,565 to V. Tulagin et al., and 3,383,993 to Shu-Hsiung Yeh. In such an imaging system, variously colored light absorbing particles are suspended in a nonconducting liquid carrier. The suspension is placed between electrodes, one of which is generally conductive, called the "injecting" electrode and the other of which is generally insulating and called the "-blocking" electrode. One of these electrodes is at least partially transparent to activating electromagnetic radiation. The suspension is subjected to a potential difference between the electrodes across the suspension and exposed to an image through said transparent electrode. As these steps are completed, selective particle migration takes place in image configuration, providing a visible image at one or both of the electrodes. An essential component of the system is the suspended particles which must be electrically photosensitive and which apparently undergo a net change in charge polarity upon exposure to activating electromagnetic radiation when brought into interaction range of one of the electrodes. In a monochromatic system, particles of a single color are used, producing a single colored image equivalent to conventional black-and-white photography. In a polychromatic system, the images are produced in natural color because mixtures of particles of two or more different colors which are each sensitive to light of a specific wavelength or narrow range of wavelengths are used.

This system, using preferably a transparent conductive injecting electrode, a substantially insulating blocking electrode and photosensitive particles dispersed in an insulating carrier liquid between the electrodes has been found to be capable of producing excellent images. One major disadvantage in the prior art systems as shown by the patents listed above is that the transparent conductive electrode had to be at least as large as the final image to be produced. This requires that expensive and usually fragile electrode materials must be used. Typically, NESA glass, a tin oxide coated glass available from Pittsburgh Plate Glass Co., was used as the injecting electrode. In addition, these electrodes because of their transparency, cost and fragility required that the image formed on their surface be transferred to another member so that the electrode could be reused. The transfer and subsequent cleaning steps represent additional, unnecessary process steps. If the cleaning step is not efficient subsequent images would be marred. In addition, the cleaning step tends to abrade the surface of the injecting electrode affecting the optical clarity of that member. Where the injecting electrode is in the form of a cylinder the image is projected down the axis of the cylinder and is reflected by a mirror into the imaging zone requiring a more complex optical system.

SUMMARY OF THE INVENTION

It is, therefore, an object of this invention to provide a photoelectrophoretic imaging system which overcomes the above-noted disadvantages.

It is another object of this invention to provide a photoelectrophoretic imaging system which does not require the use of relatively large conductive transparent electrodes.

It is another object of this invention to provide a relatively simple photoelectrophoretic imaging system.

It is another object of this invention to provide novel photoelectrophoretic imaging apparatus.

The above objects and others are accomplished in accordance with this invention by providing a photoelectrophoretic imaging system in which an imaging suspension comprising electrically photosensitive particles dispersed in a carrier liquid is caused to form a sharply defined liquid nip between electrodes or in an electrical field, exposed to imagewise actinic electromagnetic radiation close to the nips; the radiation and field causing selective particle migration in image configuration. It is preferred that the liquid nip between the electrodes be as small as practical so that light may penetrate the normally dark colored imaging suspension to the point where the electrical field is sufficient to cause particle migration. It is therefore preferred to use sharp-edged objects, or small diameter rollers or tubes as the nip forming member. Preferably, the space between the surfaces containing the nip will be 1 mil or less.

Preferably, the imaging suspension is coated on the surface of a conductive flexible web which passes over one of the nip forming members, the imaging suspension then being contacted by an insulating web which passes between the imaging suspension and the opposite nip former, at which point imagewise exposure and field application occur. Alternatively, the liquid suspension could be provided on the surface of the insulating web. The imaging suspension could also be provided on one of the webs as a dry mixture of particles in a binder and the binder liquified by heating or solvent application just prior to imaging. On separation of the webs after imaging a positive image will be formed on one web and a negative image formed on the other. It is also possible to have both webs insulating with a corona charge applied to the back of either or both webs to supply the field. Assume, for example, that a charge is applied to the back of one web and the imaging suspension is coated on the opposite web, as the webs are brought into the imaging zone the web carrying the suspension would pass over a grounded roller which would provide the requisite electric field across the imaging suspension.

The webs may also both be conductive and the field applied between the conductive webs if the webs are separated immediately after exposure to minimize particle oscillation between webs.

Since the conductive web need be conductive only at the time of imaging the web could be photoconductive, for example, a preilluminated zinc oxide-binder coating on a conductive substrate. The zinc oxide coating would be sufficiently preilluminated so that it would remain conductive for a time sufficient to move into and out of the imaging zone.

Where an insulating flexible web is used the insulating material may comprise any suitable material. Typical insulating materials include; paper, baryta paper, polyethylene coated paper, cellulose acetate, nitro cellulose, polystyrene, polytetrafluorotheylene, and related fluorinated polyolefins, polyvinylfluoride, polyethylene terephthalate and mixtures thereof. Where the image is transferred a polytetrafluoroethylene clad polyvinyl fluoride is preferred because it combines the ease of cleaning of the former with the high dielectric constant of the latter. Where the image is not transferred a zinc oxide-binder layer is preferred because its conductivity and brightness are readily controlled.

The conductive flexible web, where applicable, may consist of any suitable material. Typical materials include; flexible webs of aluminum, steel, brass, copper, nickel, zinc or similar coatings on plastic films, cloth, or paper rendered conductive by inclusion of a suitable material therein. Glass cloth impregnated with a carbon-loaded sintered polytetrafluoroethylene composition is preferred because it combines flexibility with conductivity and ease of cleaning.

The imaging suspension may comprise any suitable electrically photosensitive particles dispersed in a carrier liquid; these particles may be of one color to produce monochrome images or may be mixtures of two or more colors, for example, cyan particles, yellow particles and magenta particles mixed together in a suspension. Typical electrically photosensitive particles and carrier liquids are disclosed in U.S. Pat. No. 3,384,488, issued May 21, 1965 to V. Tulagin et al. and U.S. Pat No. 3,357,989, issued Dec. 12, 1967 to J. F. Byrne et al., the disclosures of which are incorporated herein by reference.

The imaging suspension may be applied to either or both webs by any suitable method. Typical methods include dip coating, spraying, or brushing. The suspension typically contains a dielectric liquid and dissolved resins and other additives to stabilize the suspension and to act as image fixing aids. The suspension may also be coated on a member, dried then liquified prior to imaging by heat or solvent application.

BRIEF DESCRIPTION OF THE DRAWINGS

The advantages of this improved method of photoelectrophoretic imaging will become apparent upon consideration of the detailed disclosure of the invention especially when taken in conjunction with the accompanying drawings wherein:

Referring now to FIG. 1, insulating web 1 is entrained over conductive roller 3 which is connected to a source of DC potential, not shown, and drum 5 which is partially submerged in cleaning bath 7 held in reservoir 9. To aid cleaning, bath 7 may be agitated, for example ultrasonically, and an electrode could be placed in the bath to aid particle removal.

Figure 1:
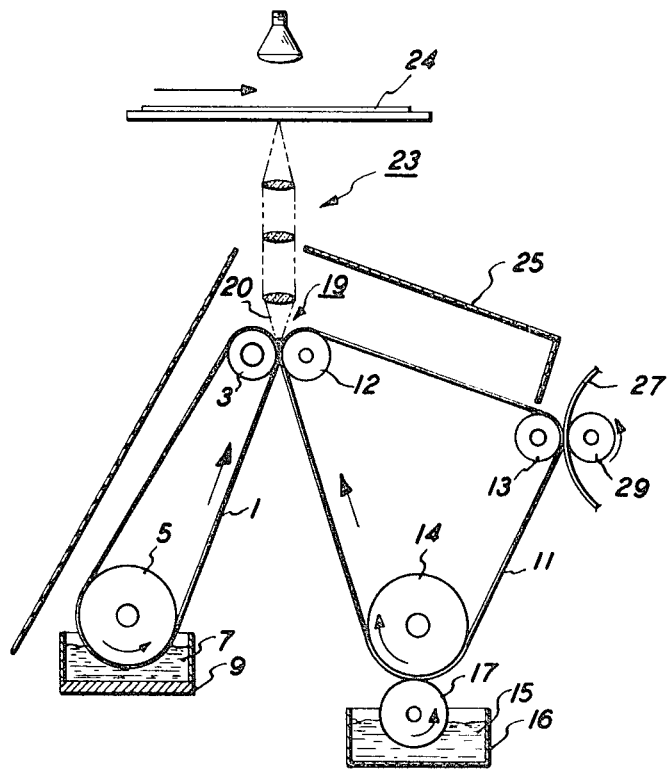
FIG. 1 is a side sectional view of a simple exemplary photoelectrophoretic imaging system wherein both webs are reused and the imaging suspension is applied to a conductive web.

Conductive web 11 is entrained over conductive roller 12, connected to a source of DC potential not shown, transfer roller 13 and drum 14. The imaging suspension 15 held in reservoir 16 is supplied to web 11 by feed roller 17.

In operation conductive web 11 picks up imaging suspension 15 from feed roller 17. The web then moves to a point where insulating web 1 contacts the imaging suspension forming a liquid nip at the imaging station 19. The liquid nip is exposed to imagewise electromagnetic radiation 20 which in this exemplary instance is a light image projected by slit projection means 23 from a moving document 24 which is to be copied. Light shield 25 is provided to eliminate stray illumination. Application of field between rollers 3 and 12 combined with imagewise exposure 20 causes particle migration in image configuration with a positive image normally adhering to conductive web 11. This image is then transferred to receiver sheet 27 by pressure or electrostatic transfer. Receiver sheet 27 is entrained over guide roller 29. The image may then be fixed by heat or laminated by overcoating or other suitable fixing method.

Insulating web 1 is directed into cleaning bath 7 where unwanted pigment particles are removed before returning to imaging station 19.

Figure 2:
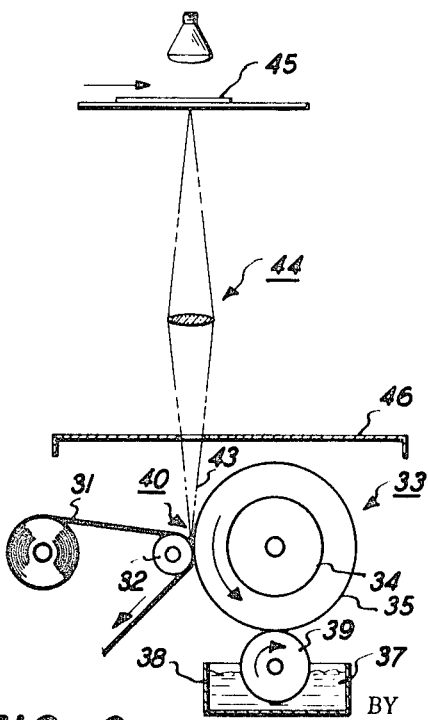
FIG. 2 is a side sectional view of a simple exemplary photoelectrophoretic imaging system wherein a conductive electrode web is used as the final image bearing sheet and the imaging suspension is applied to an insulating surface.

Referring now to FIG. 2, conductive web 31 is provided in roll form and passes over conductive roller 32. Roller 33, comprising conductive central core 34 overcoated with insulating material 35, and roller 32 are connected to a source of DC potential not shown.

In operation imaging suspension 37 held in reservoir 38 is supplied by feed roller 39 to roller 33. The imaging suspension is then contacted by web 31 creating a liquid nip at imaging station 40 where it is exposed to imagewise electromagnetic radiation 43 which in this exemplary instance is light projected by projection means 44 from the moving transparency 45 which is to be copied. Alternatively, the light image may be light reflected from an opaque document. Light shield 46 protects the imaging station from stray illumination. The combination of field and imagewise light cause particle migration in image configuration with a positive image being formed on web 31. This image may then be viewed directly or fixed as discussed above.

DESCRIPTION OF THE PREFERRED EMBODIMENTS

The following examples further specifically illustrate the improved photoelectrophoretic imaging system of this invention. Parts and percentages are by weight unless otherwise indicated. The examples below are intended to illustrate various preferred embodiments of the present invention. All of the following examples are carried out in an apparatus of the general type illustrated in FIG. 2 with additional means not shown to clean particles from the surface of roller 33. A 3,000° K. tungsten-iodine lamp is used to provide the illumination. The light image is projected by the lens system described in U.S. Pat. No. 3,212,417 issued Oct. 19, 1965 to Gundlach. In this case imagewise light is projected and directed at the liquid nip.

EXAMPLE I

In this example the drum is made conductive and the image bearing member is insulating.

A web of zinc oxide coated paper provided in roll form is entrained over a ⅛-inch conductive rubber roller. A 3-inch-diameter aluminum drum is used as the injecting electrode. The coated paper web is positioned so that it is pressed lightly against the aluminum drum. An imaging suspension, prepared by dispersing seven parts of the x form of metal free phthalocyanine prepared as shown in U.S. Pat. No. 3,357,989 in 90 parts of kerosene and 10 parts tricresyl phosphate is coated on the surface of the aluminum drum to a thickness of about 1 mil. The positive terminal of a 3,000-volt DC potential source is connected to the conductive rubber roller and the negative terminal is connected to the aluminum drum. The rubber roller and aluminum drum are driven by motors so that there is little relative movement between the imaging suspension and the aluminum drum. The imaging suspension is moved through the imaging zone at about 50 cm./sec. while the nip is exposed to an imagewise light source of about 200 foot candles. As the zinc oxide coated paper is moved out of the nip a blue negative image is formed on the surface of the zinc oxide paper.

EXAMPLE II

In examples II and III the drum is made insulating and the image bearing member is conductive.

A web of aluminized Mylar provided in roll form is entrained over a ⅛-inch-diameter conductive rubber roller with the conductive side out. A blocking electrode is made by attaching a sheet of Teflon coated tedlar to the surface of 3-inch diameter aluminum drum. The blocking electrode is positioned so that it is pressed lightly against the aluminized surface of the aluminized Mylar web. An imaging suspension is made up as in example I. The imaging suspension is coated onto the blocking electrode surface to a thickness of about 1 mil. The positive terminal of a 3,000-volt DC potential source is connected to the aluminized surface of the web, the negative terminal being connected to the conductive center core of the blocking electrode. The blocking electrode and conductive side roller electrode are driven by a motor so that there is little or no relative movement between the imaging suspension and the aluminized Mylar as they move through the imaging zone. The imaging suspension and Mylar sheet pass through the imaging zone at about 50 cm./sec. while the liquid nip is exposed to an imagewise light source of about 200 foot candles. As the aluminized Mylar is moved out of the nip a positive, blue image is found adhering to the aluminum surface of the aluminized Mylar.

EXAMPLE III

The experiment of example II is repeated except that the imaging suspension comprises two parts Monolite Fast Blue G.S., the alpha form of metal free phthalocyanine, two parts Watchung Red B (a magenta azo pigment) and two parts 2″-pyridyl-8,13-dioxodi-naphtho-(2, 1-b; 2′, 3′-d)-furan-6-carboxamide, prepared by the method disclosed in copending application Ser. No. 421,281 filed Dec. 28, 1964, now U.S. Pat.

No. 3,447,922 in 100 parts of Sohio Odorless Solvent 3440. The roller speeds are adjusted to 4 cm./sec. and the exposure is adjusted to 2,000 foot candles. The exposure is made through a full color Kodachrome transparency. A full color image is produced on the aluminum surface of the aluminized Mylar sheet.

Although specific components and proportions have been described in the above examples, other suitable materials, as listed above, may be used with similar results. In addition, other materials may be added to the imaging suspension or electrically photosensitive particles to synergize, enhance or otherwise modify their properties. For example, the photosensitive particles may be charge transfer sensitized to alter their electrical response.

Other modifications and ramifications of the present invention will occur to those skilled in the art upon a reading of the present disclosure. These are intended to be included within the scope of the invention.

What is claimed is:

1. A method of photoelectrophoretic imaging comprising the steps of:
   a. forming a sharply defined liquid nip of an imaging suspension comprising finely-divided electrically photosensitive particles dispersed in a substantially insulating carrier liquid between at least two nip forming surfaces said surfaces being spaced up to about 1 mil at the nip;
   b. applying an electrical field across said nip; and
   c. exposing said nip to electromagnetic radiation to which at least a portion of said electrically photosensitive particles are sensitive until an image is formed on at least one of said nip forming surfaces.

2. The method of claim 1 wherein at least one of said nip forming surfaces is a flexible web.

3. The method of claim 1 wherein at least one of said nip forming surfaces is a photoconductive insulating material.

4. The method of claim 1 wherein a monochromatic image is formed.

5. The method of claim 1 wherein said particles comprise particles of more than one color each of said particles of a single color having a photosensitive response which does not substantially overlap the photosensitive response of the particles of a different color.

6. The method of claim 1 and further including the step of cleaning at least one of said nip forming surfaces.

* * * * *